H. Locke,
Raisin Seeder,
No. 2,599. Reissued May 14, 1867.
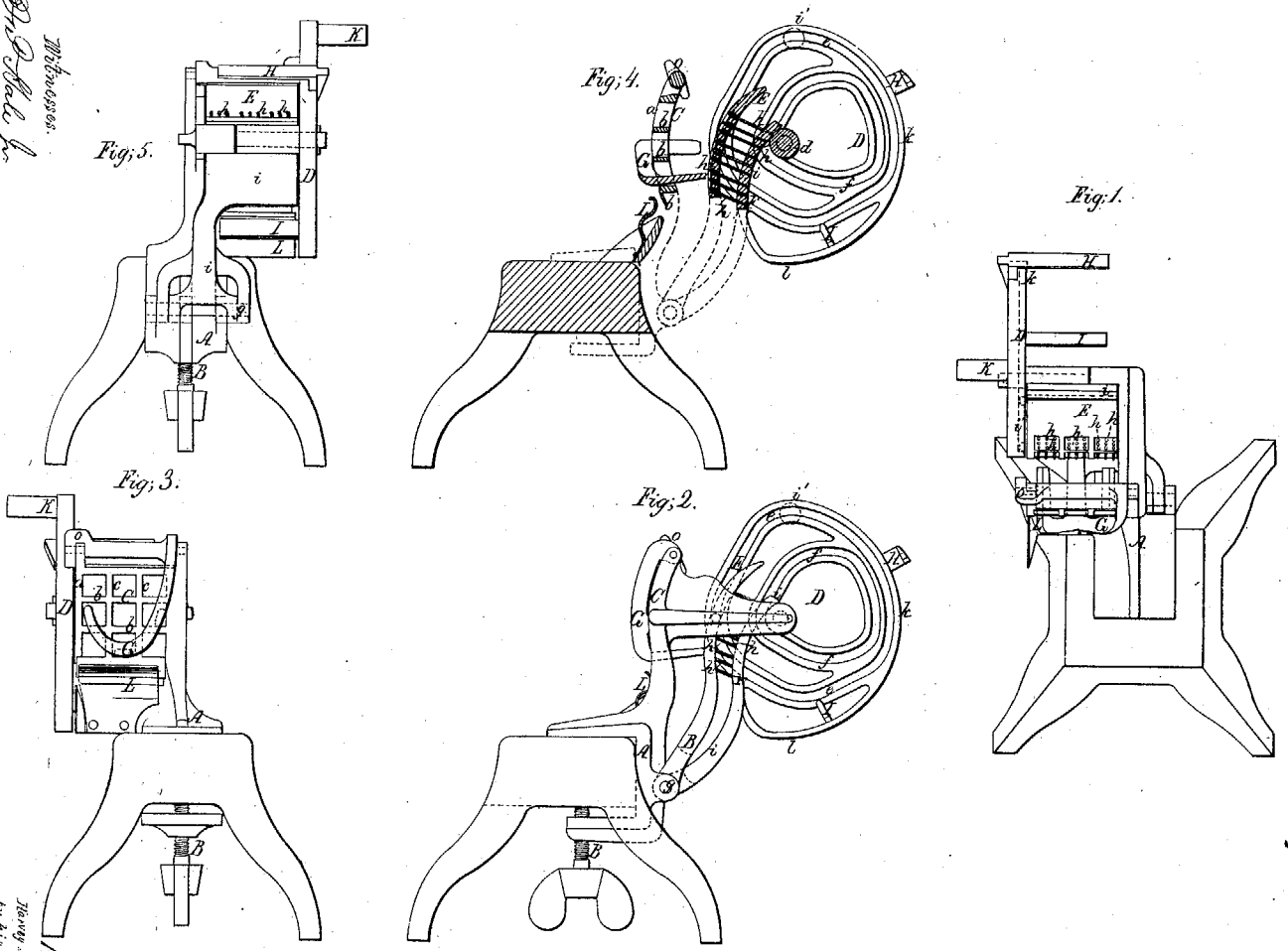
Witnesses.
D. D. Hale Jr.
S. H. Washburn.
Inventor.
Harvey Locke
by his Attorney
R. H. Ashby
N. PETERS, PHOTO-LITHOGRAPHER, WASHINGTON, D. C.

United States Patent Office.

HARVEY LOCKE, OF GRAND RAPIDS, MICHIGAN.

*Letters Patent No.* 51,201, *dated November* 28, 1865; *reissue No.* 2,599, *dated May* 14, 1867.

IMPROVED MACHINE FOR REMOVING SEEDS FROM RAISINS.

The Schedule referred to in these Letters Patent and making part of the same.

TO ALL WHOM IT MAY CONCERN:

Be it known that I, HARVEY LOCKE, formerly of South Boston, in the county of Suffolk, and State of Massachusetts, now of Grand Rapids, in the State of Michigan, have invented a new and useful Machine for Removing Seeds from Raisins, or various other fruits; and I do hereby declare the same to be fully described in the following specification, and represented in the accompanying drawings, of which—

Figure 1 is a top,

Figure 2 is a side elevation.

Figure 3 is a front view.

Figure 4 is a longitudinal section; and

Figure 5 is a rear elevation of said machine.

Similar marks of reference denote the same parts.

The object of my said invention is to remove the stones of raisins or other fruit by pressing such stones out through one side of such fruit, and separating them from the fruit, the raisins being separately delivered.

In the drawing A denotes the supporting frame or stand of the machine, it being so formed as to be capable of being clamped by a screw, B, to the edge of a table or bench. This stand supports a grate. C, composed of a square frame, *a*, and sundry bars *b b* and *c c*, arranged at right angles to each other in manner as shown in the drawings. The said frame also has a journal or gudgeon, *d*, extending from an arm at some distance in rear of the grate, and parallel to it; the said journal serving to support a cam, D, which is capable of being freely turned, and has two cam-grooves *e f* made within its inner face. In the rear of the grate C is a compresser or compressing jaw, E, whose foot is hinged to the stand A, as shown at *g*. This compresser is perforated with numerous holes to receive a series of pins, *h*, projecting from an arm, *i*, which is also hinged to the stand A, such arm and pins composing what I term the seed-expeller F. The several pins are arranged in clusters, and so that such clusters may pass into and through the interstices of the grate C. Studs projecting from the compressing jaw E and the seed-expeller F enter the two cam-grooves *e f*. A retainer or board, G, hinged to the upper part of the stand A, has a series of prongs or fingers which pass through the grate openings and serve to support a raisin when first dropped into the machine. A projection, O, from the said retainer, rests against the periphery of the cam or cam-wheel D, and is operated by the circular arc *i k l*, the operation being such as to cause the retainer to move out of and somewhat beyond the grate, and there remain until after the expulsion of the seeds from a fruit may have been effected, and such fruit and seed been removed from the machine, which having been accomplished, the retainer by its own gravity will drop back to place. Two scrapers H I project from the wheel or cam D, as shown in the drawing. These scrapers are so arranged that during each revolution of the wheel D one of them shall pass across the outer face of the grate *c*, and the other pass against its inner face, or between the latter and the compressing jaw E. The first of these scrapers is the seed-discharger, its office being to clear or discharge the seeds from the grate and the points of the pins *h*. The duty of the second of such scrapers (viz, that marked I) is to clear the remainder of the fruit from the machine. A crank or handle, K, extends from the outer face of the wheel D. By applying the hand to this crank with sufficient force, a person may revolve the cam-wheel D, and thereby put in action the several parts of the machine in the order required to effect the stoning or seeding of a raisin or other fruit after it may have been dropped between the grate C and the compressing jaw E, and upon the retainer G.

The action of the machine may be thus described: A raisin having been dropped between the grate and the compressing jaw, and upon the retainer, while the cam-wheel D is in revolution, will be kept from falling out of the machine while the said jaw is in the act of being moved up against the raisin to force it against the grate; this having taken place, the expeller will be advanced so as to cause its pins to pass through the fruit and against the seeds therein, and expel the seeds from the fruit, and through the openings of the grate. Next the seed-cleaning scraper H passes across the grate, and separates the seeds therefrom, after which the compressing jaw recedes, and the other scraper passes down between it and the grate, and removes the stoned fruit from the machine. An inclined spring-blade L, arranged below and in front of the grate, serves to remove from the said clearer such seeds as may adhere to it while it may be in the act of passing between such spring-blade and the grate. A hopper may be applied to the stand A, so as to hold the raisins and discharge them at intervals into the machine, such hopper being provided with a suitable means of effecting such discharge. I contemplate applying a fly-wheel on the cam-plate D, so as to enable it to operate with a steady motion.

What I claim, and desire to secure by Letters Patent, is—

1. The combination of mechanism for compressing the fruit and ejecting the seeds, with a clamp for attaching the raisin-stoning machine, removably, to a table or support, substantially as set forth.

2. I claim the combination of the compressing jaw with the grate and expeller, substantially as set forth.

3. I claim the retainer G, in combination with the compressing jaw and seed-expeller, substantially as set forth.

4. I claim removing the seeds from the expeller F by a clearer, H, substantially as set forth.

5. I claim removing the raisins from the machine by the clearer I, substantially as set forth.

6. I claim the blade L, in combination with the clearer H, for the purpose and substantially as set forth.

7. I claim, in a machine for stoning raisins, the combination of mechanism for compressing the fruit, with mechanism for ejecting and removing the seeds, substantially as set forth.

In witness whereof I have hereunto set my signature this twenty-third day of March, A. D. 1867.

HARVEY LOCKE.

Witnesses:

JAMES A. ROGERS,

D. P. CLAY.